US008231061B2

(12) United States Patent  
Narendra et al.

(10) Patent No.: US 8,231,061 B2
(45) Date of Patent: Jul. 31, 2012

(54) CONTACTLESS DEVICE WITH MINIATURIZED ANTENNA

(75) Inventors: Siva G. Narendra, Portland, OR (US); Prabhakar Tadepalli, Bangalore (IN)

(73) Assignee: Tyfone, Inc, Portland, OR (US)

( * ) Notice: Subject to any disclaimer, the term of this patent is extended or adjusted under 35 U.S.C. 154(b) by 314 days.

(21) Appl. No.: 12/710,560

(22) Filed: Feb. 23, 2010

(65) Prior Publication Data

US 2010/0213265 A1 Aug. 26, 2010

Related U.S. Application Data

(60) Provisional application No. 61/155,144, filed on Feb. 24, 2009.

(51) Int. Cl.
*G06K 19/06* (2006.01)
(52) U.S. Cl. ........................ 235/492; 235/487
(58) Field of Classification Search .................. 235/375, 235/492, 487, 488
See application file for complete search history.

(56) References Cited

U.S. PATENT DOCUMENTS

| | | | |
|---|---|---|---|
| 4,701,601 A | 10/1987 | Francini et al. |
| 4,786,791 A | 11/1988 | Hodama |
| 4,791,283 A | 12/1988 | Burkhardt |
| 4,864,109 A | 9/1989 | Minematsu et al. |
| 5,212,478 A | 5/1993 | Moseley |
| 5,378,887 A | 1/1995 | Kobayashi |
| 5,537,584 A | 7/1996 | Miyai et al. |
| 5,574,273 A | 11/1996 | Nakagawa et al. |
| 5,585,787 A | 12/1996 | Wallerstein |
| 5,629,981 A | 5/1997 | Nerlikar |
| 5,700,037 A | 12/1997 | Keller |
| 5,710,421 A | 1/1998 | Kokubu |
| 5,834,756 A | 11/1998 | Gutman et al. |
| 5,909,491 A | 6/1999 | Luo |
| 5,949,880 A | 9/1999 | Curry et al. |
| 5,952,641 A | 9/1999 | Korshun |
| 5,955,961 A | 9/1999 | Wallerstein |
| 6,016,476 A | 1/2000 | Maes et al. |
| 6,021,944 A | 2/2000 | Arakaki |
| 6,039,260 A | 3/2000 | Eisele |
| 6,068,184 A | 5/2000 | Barnett |

(Continued)

FOREIGN PATENT DOCUMENTS

DE 3632294 A1 4/1988

(Continued)

OTHER PUBLICATIONS

Lee, Youbok, "Anntenna Circuit Design for RFID Applications", Microchip, AN710, 2003, Microchip Technology Inc., 50 pages.
International Search Report and Written Opinion received for the PCT Application No. PCT/US2010/025014, mailed on Apr. 15, 2010, 9 pages.
International Search Report received for PCT Application No. PCT/US2008/057588, mailed on Aug. 7, 2008, 1 page.

(Continued)

*Primary Examiner* — Karl D Frech
(74) *Attorney, Agent, or Firm* — Dana LeMoine; LeMoine Patent Services, PLLC (57) ABSTRACT

A contactless device includes a miniaturized antenna. The antenna includes an inductive coupling element that presents a field coupling surface area to couple to a magnetic field. The inductive element may be made of layers where conductive loops are formed parallel to the layers or perpendicular to the layers. When conductive loops are formed perpendicular to the layers, the effective field coupling surface area is increased. The inductive element is positioned on an outside edge of a memory card compatible device with the field coupling surface area perpendicular to the card.

17 Claims, 9 Drawing Sheets

U.S. PATENT DOCUMENTS

| | | |
|---|---|---|
| 6,182,891 B1 | 2/2001 | Furuhashi et al. |
| 6,189,786 B1 | 2/2001 | Itou et al. |
| 6,206,293 B1 | 3/2001 | Gutman et al. |
| 6,219,439 B1 | 4/2001 | Burger |
| 6,223,954 B1 | 5/2001 | Carow |
| 6,223,984 B1 | 5/2001 | Renner et al. |
| 6,250,557 B1 | 6/2001 | Forslund et al. |
| 6,315,195 B1 | 11/2001 | Ramachandran |
| 6,402,029 B1 | 6/2002 | Gangi |
| 6,481,623 B1 | 11/2002 | Grant et al. |
| 6,568,600 B1 | 5/2003 | Carpier et al. |
| 6,592,044 B1 | 7/2003 | Wong et al. |
| 6,594,759 B1 | 7/2003 | Wang |
| 6,598,031 B1 | 7/2003 | Ice |
| 6,607,127 B2 | 8/2003 | Wong |
| 6,609,654 B1 | 8/2003 | Anderson et al. |
| 6,631,849 B2 | 10/2003 | Blossom |
| 6,636,833 B1 | 10/2003 | Flitcroft et al. |
| 6,669,487 B1 | 12/2003 | Nishizawa et al. |
| 6,705,520 B1 | 3/2004 | Pitroda et al. |
| 6,712,277 B2 | 3/2004 | Spencer |
| 6,715,679 B1 | 4/2004 | Infosino |
| 6,721,196 B1 | 4/2004 | Grassl |
| 6,747,547 B2 | 6/2004 | Benson |
| 6,764,005 B2 | 7/2004 | Cooper |
| 6,769,607 B1 | 8/2004 | Pitroda et al. |
| 6,805,288 B2 | 10/2004 | Routhenstein et al. |
| 6,811,082 B2 | 11/2004 | Wong |
| 6,836,843 B2 | 12/2004 | Seroussi et al. |
| 6,857,566 B2 | 2/2005 | Wankmueller |
| 6,882,900 B1 | 4/2005 | Terranova |
| 6,883,718 B1 | 4/2005 | Le et al. |
| 6,905,072 B2 | 6/2005 | Ramachandran |
| 6,907,123 B1 | 6/2005 | Schier |
| 6,908,030 B2 | 6/2005 | Rajasekaran et al. |
| 6,925,568 B1 | 8/2005 | Heinonen |
| 6,937,526 B2 | 8/2005 | Furukawa |
| 6,952,788 B2 | 10/2005 | Rommelmann et al. |
| 6,995,651 B2 | 2/2006 | Amtmann et al. |
| 7,059,520 B1 | 6/2006 | Shtesl |
| 7,088,246 B2 | 8/2006 | Fukuoka |
| 7,185,146 B2 | 2/2007 | Masuyama et al. |
| 7,221,473 B2 | 5/2007 | Jeran et al. |
| 7,281,101 B2 | 10/2007 | Mizushima et al. |
| 7,295,790 B2 | 11/2007 | Morimoto et al. |
| 7,333,062 B2 | 2/2008 | Leizerovich et al. |
| 7,350,717 B2 | 4/2008 | Conner et al. |
| 7,353,993 B2 | 4/2008 | Fujimoto |
| 7,410,102 B2 | 8/2008 | Winkler |
| 7,493,484 B2 | 2/2009 | Lee |
| 7,558,107 B2 | 7/2009 | Sakurai et al. |
| 7,558,110 B2 | 7/2009 | Mizushima et al. |
| 7,581,678 B2 | 9/2009 | Narendra et al. |
| 7,607,580 B2 | 10/2009 | Takita et al. |
| 7,673,080 B1 | 3/2010 | Yu et al. |
| RE41,352 E | 5/2010 | Wood, Jr. |
| 7,716,082 B1 | 5/2010 | Blalock |
| RE41,471 E | 8/2010 | Wood, Jr. |
| 7,789,303 B2 | 9/2010 | Fukasawa |
| 7,792,516 B2 | 9/2010 | Soderstrom |
| 7,828,214 B2 | 11/2010 | Narendra et al. |
| RE42,254 E | 3/2011 | Wood, Jr. |
| 7,898,994 B2 | 3/2011 | Zhao et al. |
| 7,933,571 B2 | 4/2011 | Black et al. |
| 7,941,197 B2 | 5/2011 | Jain et al. |
| 7,948,356 B2 | 5/2011 | Kawamura et al. |
| 7,954,715 B2 | 6/2011 | Narendra et al. |
| 7,954,716 B2 | 6/2011 | Narendra et al. |
| 7,954,717 B2 | 6/2011 | Narendra et al. |
| 7,961,101 B2 | 6/2011 | Narendra et al. |
| 7,991,158 B2 | 8/2011 | Narendra et al. |
| 8,072,331 B2 | 12/2011 | Narendra et al. |
| 8,083,145 B2 | 12/2011 | Narendra et al. |
| 8,091,786 B2 | 1/2012 | Narendra et al. |
| 2001/0002035 A1 | 5/2001 | Kayanakis |
| 2001/0006902 A1 | 7/2001 | Ito |
| 2001/0013551 A1 | 8/2001 | Ramachandran |
| 2001/0034246 A1 | 10/2001 | Hutchison et al. |
| 2002/0007434 A1 | 1/2002 | Campardo |
| 2002/0043566 A1 | 4/2002 | Goodman et al. |
| 2002/0044043 A1 | 4/2002 | Chaco et al. |
| 2002/0095588 A1 | 7/2002 | Shigematsu et al. |
| 2002/0096570 A1 | 7/2002 | Wong et al. |
| 2002/0099665 A1 | 7/2002 | Burger et al. |
| 2002/0130187 A1 | 9/2002 | Berg et al. |
| 2002/0138422 A1 | 9/2002 | Natsuno |
| 2002/0138735 A1 | 9/2002 | Felt et al. |
| 2002/0139849 A1 | 10/2002 | Gangi |
| 2002/0148892 A1 | 10/2002 | Bardwell |
| 2002/0153424 A1 | 10/2002 | Li |
| 2002/0158747 A1 | 10/2002 | McGregor et al. |
| 2002/0178124 A1 | 11/2002 | Lewis |
| 2002/0180584 A1 | 12/2002 | McGregor et al. |
| 2002/0186845 A1 | 12/2002 | Dutta et al. |
| 2003/0025939 A1 | 2/2003 | Jeran et al. |
| 2003/0028481 A1 | 2/2003 | Flitcroft et al. |
| 2003/0052168 A1 | 3/2003 | Wong |
| 2003/0057278 A1 | 3/2003 | Wong |
| 2003/0061168 A1 | 3/2003 | Routhenstein |
| 2003/0079096 A1 | 4/2003 | Murakami |
| 2003/0080183 A1 | 5/2003 | Rajasekaran et al. |
| 2003/0085288 A1 | 5/2003 | Luu |
| 2003/0115126 A1 | 6/2003 | Pitroda |
| 2003/0128124 A1 | 7/2003 | Amtmann et al. |
| 2003/0159050 A1 | 8/2003 | Gantman et al. |
| 2003/0200180 A1 | 10/2003 | Phelan, III et al. |
| 2003/0220876 A1 | 11/2003 | Burger et al. |
| 2003/0231550 A1 | 12/2003 | Macfarlane |
| 2004/0006654 A1 | 1/2004 | Bando |
| 2004/0027881 A1 | 2/2004 | Furukawa |
| 2004/0030660 A1 | 2/2004 | Shatford |
| 2004/0035942 A1 | 2/2004 | Silverman |
| 2004/0050930 A1 | 3/2004 | Rowe |
| 2004/0058705 A1 | 3/2004 | Morgan et al. |
| 2004/0064612 A1 | 4/2004 | Pinto et al. |
| 2004/0065733 A1 | 4/2004 | Fukuoka |
| 2004/0077372 A1 | 4/2004 | Halpern |
| 2004/0087339 A1 | 5/2004 | Goldthwaite et al. |
| 2004/0094624 A1 | 5/2004 | Fernandes et al. |
| 2004/0133787 A1 | 7/2004 | Doughty et al. |
| 2004/0162932 A1 | 8/2004 | Mizushima et al. |
| 2004/0177045 A1 | 9/2004 | Brown |
| 2004/0188519 A1 | 9/2004 | Cassone |
| 2004/0199469 A1 | 10/2004 | Barillova et al. |
| 2004/0227859 A1 | 11/2004 | Liang |
| 2004/0243785 A1 | 12/2004 | Shanmugasundaram et al. |
| 2004/0243806 A1 | 12/2004 | McKinley et al. |
| 2004/0251303 A1 | 12/2004 | Cooper |
| 2004/0255145 A1 | 12/2004 | Chow |
| 2005/0006462 A1 | 1/2005 | Rouille et al. |
| 2005/0017068 A1 | 1/2005 | Zalewski et al. |
| 2005/0022002 A1 | 1/2005 | Poisner |
| 2005/0029349 A1 | 2/2005 | McGregor et al. |
| 2005/0038736 A1 | 2/2005 | Saunders |
| 2005/0039027 A1 | 2/2005 | Shapiro |
| 2005/0044044 A1 | 2/2005 | Burger et al. |
| 2005/0050367 A1 | 3/2005 | Burger et al. |
| 2005/0052924 A1 | 3/2005 | Nishizawa et al. |
| 2005/0060586 A1 | 3/2005 | Burger et al. |
| 2005/0071282 A1 | 3/2005 | Lu et al. |
| 2005/0077349 A1 | 4/2005 | Bonalle et al. |
| 2005/0092830 A1 | 5/2005 | Blossom |
| 2005/0108096 A1 | 5/2005 | Burger et al. |
| 2005/0109838 A1 | 5/2005 | Linlor |
| 2005/0116026 A1 | 6/2005 | Burger et al. |
| 2005/0121512 A1 | 6/2005 | Wankmueller |
| 2005/0122209 A1 | 6/2005 | Black |
| 2005/0127164 A1 | 6/2005 | Wankmueller |
| 2005/0127166 A1 | 6/2005 | Minemura |
| 2005/0133606 A1 | 6/2005 | Brown |
| 2005/0136964 A1 | 6/2005 | Le Saint et al. |
| 2005/0168339 A1 | 8/2005 | Arai et al. |
| 2005/0177724 A1 | 8/2005 | Ali et al. |
| 2005/0197859 A1 | 9/2005 | Wilson et al. |
| 2005/0204077 A1 | 9/2005 | Kou |
| 2005/0204092 A1 | 9/2005 | Masuyama et al. |
| 2005/0212657 A1 | 9/2005 | Simon |

| | | |
|---|---|---|
| 2005/0223143 A1 | 10/2005 | Kang et al. |
| 2005/0240778 A1 | 10/2005 | Saito et al. |
| 2005/0246546 A1 | 11/2005 | Takagi et al. |
| 2005/0253687 A1 | 11/2005 | Martinez et al. |
| 2005/0258245 A1 | 11/2005 | Bates et al. |
| 2005/0268058 A1 | 12/2005 | Drasnin et al. |
| 2005/0268330 A1 | 12/2005 | Di Rienzo |
| 2006/0011731 A1 | 1/2006 | Anders et al. |
| 2006/0027655 A1 | 2/2006 | Smets et al. |
| 2006/0045555 A1 | 3/2006 | Morimoto et al. |
| 2006/0077039 A1 | 4/2006 | Ibi et al. |
| 2006/0097851 A1 | 5/2006 | Amtmann et al. |
| 2006/0124755 A1 | 6/2006 | Ito |
| 2006/0169778 A1 | 8/2006 | Chung |
| 2006/0172606 A1 | 8/2006 | Irisawa |
| 2006/0186209 A1 | 8/2006 | Narendra et al. |
| 2006/0219776 A1 | 10/2006 | Finn |
| 2006/0226217 A1 | 10/2006 | Narendra et al. |
| 2006/0268764 A1 | 11/2006 | Harris |
| 2006/0279413 A1 | 12/2006 | Yeager |
| 2007/0033334 A1 | 2/2007 | Katayama et al. |
| 2007/0076877 A1 | 4/2007 | Camp et al. |
| 2007/0108280 A1 | 5/2007 | Li et al. |
| 2007/0110404 A1 | 5/2007 | Ching et al. |
| 2007/0145135 A1 | 6/2007 | Jogand-Coulomb et al. |
| 2007/0145152 A1 | 6/2007 | Jogand-Coulomb et al. |
| 2007/0195458 A1 | 8/2007 | Sawai et al. |
| 2007/0205864 A1 | 9/2007 | Mutti et al. |
| 2007/0257797 A1 | 11/2007 | Rancien et al. |
| 2007/0293202 A1 | 12/2007 | Moshir et al. |
| 2008/0046649 A1 | 2/2008 | Ito |
| 2008/0065830 A1 | 3/2008 | Aoki et al. |
| 2008/0068173 A1 | 3/2008 | Alexis et al. |
| 2008/0073436 A1 | 3/2008 | Nishizawa et al. |
| 2008/0136619 A1 | 6/2008 | Moran |
| 2008/0147950 A1 | 6/2008 | Chen |
| 2008/0148077 A1 | 6/2008 | Lee et al. |
| 2008/0153416 A1 | 6/2008 | Washiro |
| 2008/0186174 A1 | 8/2008 | Alexis et al. |
| 2008/0214111 A1 | 9/2008 | Moshir et al. |
| 2008/0244208 A1 | 10/2008 | Narendra et al. |
| 2008/0279381 A1 | 11/2008 | Narendra et al. |
| 2008/0311849 A1 | 12/2008 | Washiro |
| 2008/0318535 A1 | 12/2008 | Black et al. |
| 2009/0065571 A1 | 3/2009 | Jain |
| 2009/0065572 A1 | 3/2009 | Jain |
| 2009/0069049 A1 | 3/2009 | Jain |
| 2009/0069050 A1 | 3/2009 | Jain et al. |
| 2009/0069051 A1 | 3/2009 | Jain et al. |
| 2009/0069052 A1 | 3/2009 | Jain et al. |
| 2009/0070272 A1 | 3/2009 | Jain |
| 2009/0070691 A1 | 3/2009 | Jain |
| 2009/0070861 A1 | 3/2009 | Jain |
| 2009/0108063 A1* | 4/2009 | Jain et al. ............... 235/380 |
| 2009/0150610 A1 | 6/2009 | Hsu et al. |
| 2009/0152361 A1 | 6/2009 | Narendra et al. |
| 2009/0199283 A1 | 8/2009 | Jain |
| 2009/0250521 A1* | 10/2009 | Fujita et al. ............ 235/488 |
| 2009/0265552 A1 | 10/2009 | Moshir et al. |
| 2009/0270127 A1 | 10/2009 | Kakimoto |
| 2009/0290582 A1 | 11/2009 | Suenaga et al. |
| 2009/0298540 A1 | 12/2009 | Narendra et al. |
| 2009/0315667 A1 | 12/2009 | Kawamura et al. |
| 2010/0033307 A1 | 2/2010 | Narendra et al. |
| 2010/0033310 A1 | 2/2010 | Narendra et al. |
| 2010/0049878 A1 | 2/2010 | Yu et al. |
| 2011/0053644 A1 | 3/2011 | Narendra et al. |
| 2011/0073663 A1 | 3/2011 | Narendra et al. |
| 2011/0073665 A1 | 3/2011 | Narendra et al. |
| 2011/0077052 A1 | 3/2011 | Narendra et al. |
| 2011/0110404 A1 | 5/2011 | Washiro |
| 2011/0171996 A1 | 7/2011 | Narendra et al. |
| 2011/0180610 A1 | 7/2011 | Narendra et al. |
| 2011/0220726 A1 | 9/2011 | Narendra et al. |
| 2011/0223972 A1 | 9/2011 | Narendra et al. |
| 2011/0269438 A1 | 11/2011 | Narendra et al. |
| 2011/0271044 A1 | 11/2011 | Narendra et al. |
| 2011/0272468 A1 | 11/2011 | Narendra et al. |
| 2011/0272469 A1 | 11/2011 | Narendra et al. |

FOREIGN PATENT DOCUMENTS

| | | |
|---|---|---|
| DE | 10054890 A1 | 4/2002 |
| EP | 161060 A1 | 11/1985 |
| EP | 0818757 A2 | 1/1998 |
| EP | 1014290 A2 | 6/2000 |
| EP | 1117068 A1 | 7/2001 |
| EP | 1178450 A2 | 2/2002 |
| EP | 1189465 A1 | 3/2002 |
| EP | 1291748 A2 | 3/2003 |
| GB | 2316908 A | 3/1998 |
| JP | 04-102112 A | 4/1992 |
| JP | 2000-010668 A | 1/2000 |
| JP | 2005-018671 A | 1/2005 |
| JP | 2007-199847 A | 8/2007 |
| JP | 2007-328689 A | 12/2007 |
| TW | 200905471 | 2/2009 |
| TW | 201020934 A1 | 6/2010 |
| TW | 201023662 A1 | 6/2010 |
| TW | I336449 | 1/2011 |
| TW | 201126422 A1 | 8/2011 |
| WO | 96/26500 A1 | 8/1996 |
| WO | 98/12674 A2 | 3/1998 |
| WO | 00/14678 A1 | 3/2000 |
| WO | 01/88659 A3 | 11/2001 |
| WO | 03/029942 A2 | 4/2003 |
| WO | 03/077473 A1 | 9/2003 |
| WO | 03/081519 A2 | 10/2003 |
| WO | 2004/012352 A1 | 2/2004 |
| WO | 2004/095169 A2 | 11/2004 |
| WO | 2005/027030 A1 | 3/2005 |
| WO | 2005/119607 A2 | 12/2005 |
| WO | 2005/119608 A1 | 12/2005 |
| WO | 2005/119607 A3 | 5/2006 |
| WO | 2006/091709 A2 | 8/2006 |
| WO | 2006/091709 A3 | 12/2006 |
| WO | 2006/108184 A1 | 12/2006 |
| WO | 2007/011937 A2 | 1/2007 |
| WO | 2008/121566 A1 | 10/2008 |
| WO | 2009/147548 A2 | 12/2009 |
| WO | 2010/099093 A1 | 9/2010 |

OTHER PUBLICATIONS

International Preliminary Report on Patentability and Written Opinion received for PCT Application No. PCT/US2008/057588, issued on Oct. 6, 2009, 6 pages.
International Search Report received for the PCT Application No. PCT/US2005/022993, mailed on Oct. 21, 2005, 3 pages.
International Preliminary Report and Written Opinion received for the PCT Application No. PCT/US2005/022993, issued on Dec. 4, 2006, 6 pages.
International Preliminary Report and Written Opinion on Patentability received for PCT Application No. PCT/US2005/019988 , issued on Dec. 4, 2006, 9 Pages.
International Search Report received for PCT Application No. PCT/US2005/019988, mailed on Dec. 16, 2005, 5 pages.
International Search Report received for PCT Application No. PCT/US2006/027847, mailed on Mar. 29, 2007, 5 pages.
International Preliminary Report and Written Opinion received for PCT Application No. PCT/US2006/027847, issued on Jan. 22, 2008, 10 pages.
International Preliminary Report on Patentability and Written Opinion received for the US Patent Application No. PCT/US2006/013603, issued on Oct. 9, 2007, 7 pages.
International Search Report received for the PCT Application No. PCT/US2006/013603, mailed on Jan. 9, 2006, 3 pages.
International Preliminary Report on Patentability and Written Opinion received for PCT Application No. PCT/US2006/006361, issued on Aug. 28, 2007, 8 pages.
International Search Report received for the PCT Application No. PCT/US2006/006361, mailed on Sep. 22, 2006, 4 pages.
International Preliminary Report on Patentability and Written Opinion received for PCT Application No. PCT/US2010/025014, mailed on Sep. 9, 2011, 6 pages.

* cited by examiner

CONTACTLESS DEVICE WITH MINIATURIZED ANTENNA

RELATED APPLICATIONS

Benefit is claimed under 35 U.S.C. 119(e) to U.S. Provisional Application Ser. No. 61/155,144, entitled "Contactless Device with Miniaturized Antenna" by Narendra et al., filed Feb. 24, 2009, which is herein incorporated in its entirety by reference for all purposes.

FIELD

The present invention relates generally to contactless devices, and more specifically to small contactless devices.

BACKGROUND

Figure 1A:
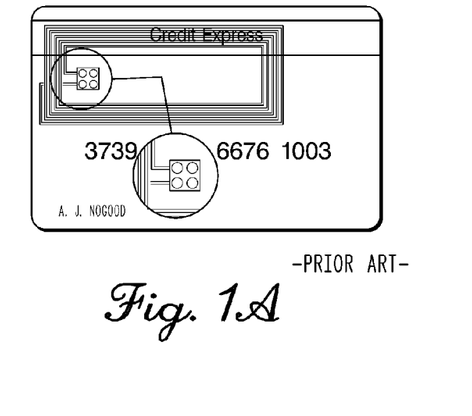
FIGS. 1A, 1B, 2A, and 2B shows prior art contactless cards and their usage.
Figure 1B:
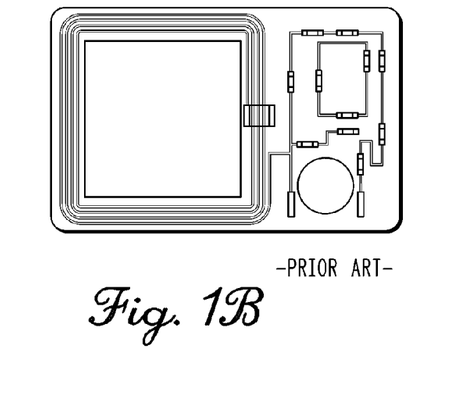
Figure 2A:
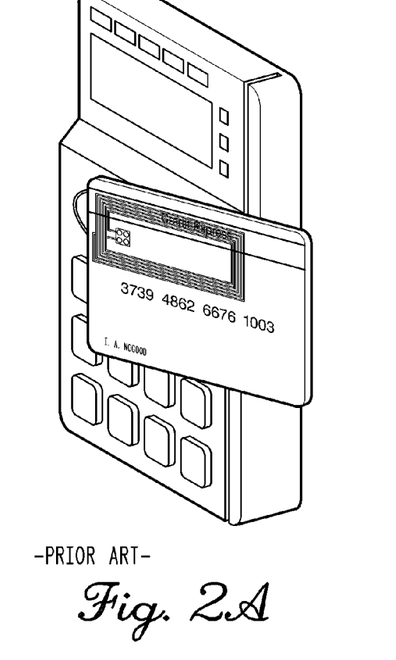
Figure 2B:
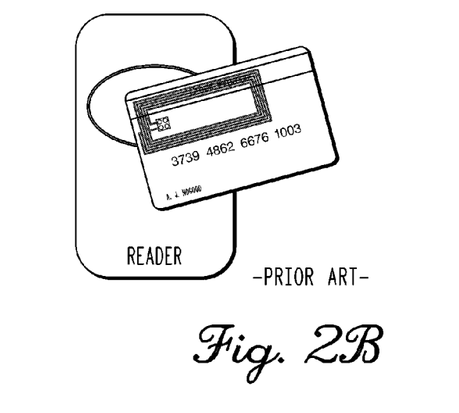

FIGS. 1A, 1B, 2A and 2B show prior art. FIGS. 1A and 1B show antennas parallel to substrate. This is typical of credit cards that include contactless technology. FIGS. 2A and 2B show the prior art cards being held substantially parallel to the card reader in order to couple magnetic energy from the reader to the coil.

DESCRIPTION OF EMBODIMENTS

In the following detailed description, reference is made to the accompanying drawings that show, by way of illustration, various embodiments of an invention. These embodiments are described in sufficient detail to enable those skilled in the art to practice the invention. It is to be understood that the various embodiments of the invention, although different, are not necessarily mutually exclusive. For example, a particular feature, structure, or characteristic described in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 3:
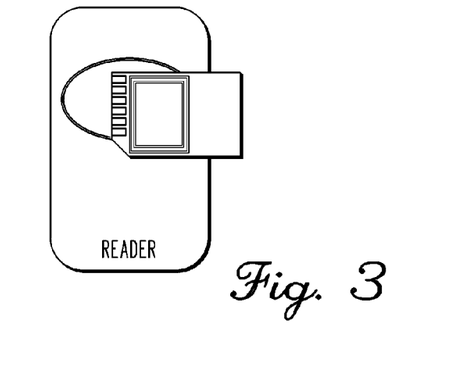
FIG. 3 shows how the prior art antenna will affect usage of a memory card.

FIG. 3 shows how the prior art antenna will affect usage of a memory card. If a memory card 320 has a loop antenna wound parallel to the substrate, then the card will be held parallel to the reader 310 as shown.

Figure 4:
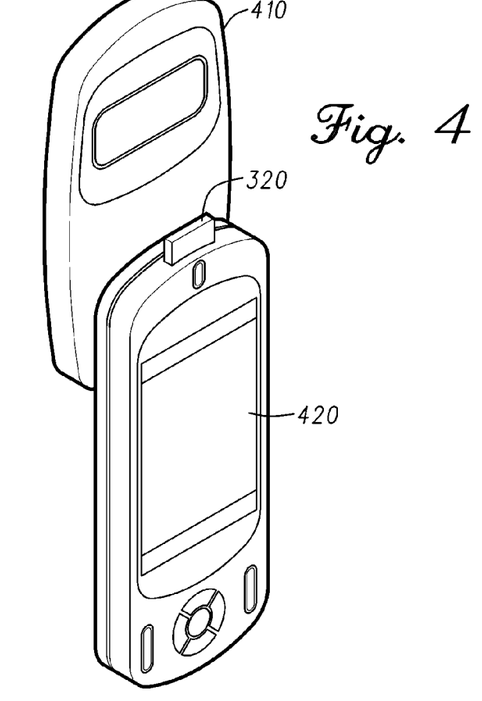
FIG. 4 shows how the prior art antenna will affect usage of a memory card when inserted in a mobile device.

FIG. 4 shows how the prior art antenna will affect usage of a memory card when inserted in a mobile device. The field is flowing perpendicular to the reader 410. If the memory card 320 has a loop antenna wound parallel to the substrate, the mobile device 420 will be held parallel to the reader 410 as shown in FIG. 4. For consumer convenience, the memory card is usually not taken out of the mobile device 420. If the mobile device 420 is held as in FIG. 4, the system may not work because there are other metal regions between the memory card antenna and the reader 410. These other metal regions could be because of the memory card's holder inside the mobile device as well as the mobile device's printed circuit board (PCB) metal routing and components/solder. Accordingly, the field from the reader 410 may not reach the antenna's conducting metal since it may be absorbed by other metal regions.

Figure 5:
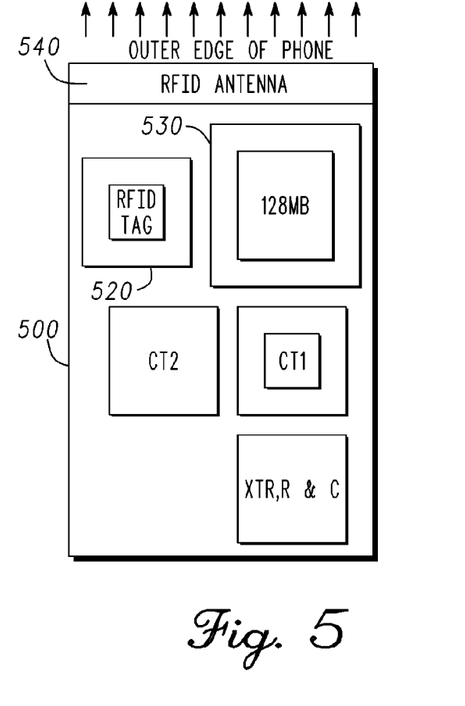
FIG. 5 shows placement of a miniaturized antenna on a memory card.

FIG. 5 shows placement of a miniaturized antenna on a memory card. Memory card 500 is shown with RFID tag 520, RFID antenna 540, memory 530, and various other components. The miniaturized antenna 540 is formed from an inductive device with at least one coil. The inductive device is positioned at the outer edge of the memory card 500 as shown. The memory card 500 may be any form factor including secure digital (SD), mini-SD, micro-SD, or the like.

To allow for capturing the field from the reader that is flowing perpendicular to the reader, the miniaturized antenna 540 is placed at the very edge of the memory card 500 so it is near the outer edge of the memory card slot when inserted in a mobile device.

Various embodiments of the present invention provide for manufacturing an inductive coil that is small enough to be placed at the outer edge, and placement and orientation of the coil that allows for the field from the reader to flow into the antenna.

Figure 6:
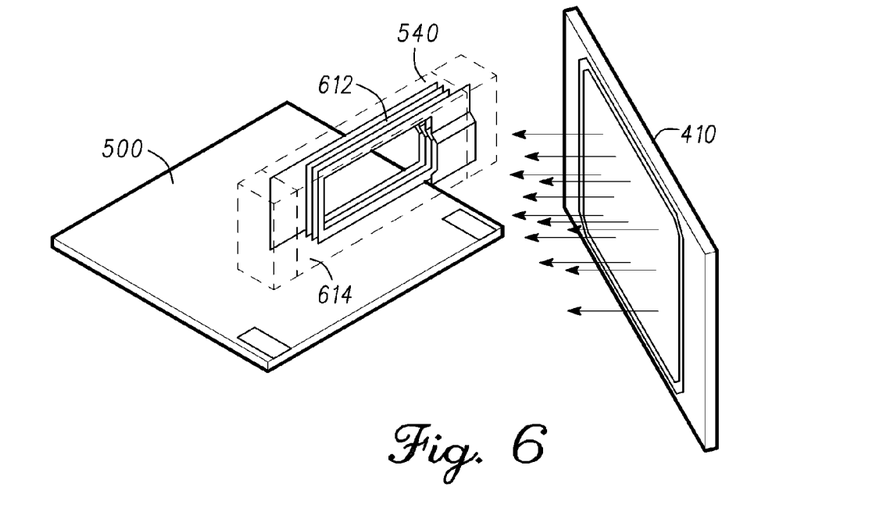
FIG. 6 shows orientation of a miniaturized antenna on a memory card.

FIG. 6 shows orientation of a miniaturized antenna on a memory card. Miniaturized antenna 540 is a three dimensional (3D) inductive coil encased in a filler material 614. The inductive device is positioned at the outer edge of the memory card as shown. The orientation of antenna 540 is such that the field from 610 couples to the 3D inductive coil of the antenna. The memory card may be any form factor including secure digital (SD), mini-SD, micro-SD, or the like.

Figure 7:
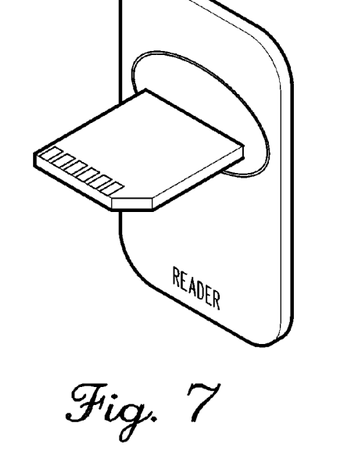
FIG. 7 shows orientation of a memory card with respect to a reader.

FIG. 7 shows orientation of a memory card with respect to a reader. Memory card 500 includes a miniaturized antenna at the edge of the card. See FIGS. 5, 6. When the antenna is positioned on memory card 500 as shown in FIG. 6, the memory card 500 can be positioned perpendicular to the reader 410 as shown in FIG. 7.

Figure 8:
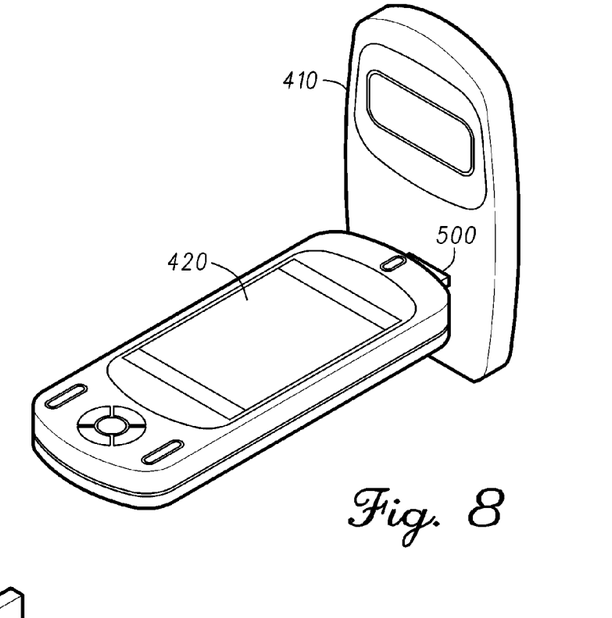
FIG. 8 shows orientation of a mobile device with respect to a reader.

FIG. 8 shows orientation of a mobile device with respect to a reader. When the memory card 500 of FIG. 7 is inserted in the mobile device 420 of FIG. 8, then the mobile device 420 may be oriented as shown. This allows the magnetic field to enter the antenna at the edge of the memory card 500 without first having to penetrate the back of the mobile device.

Figure 9:
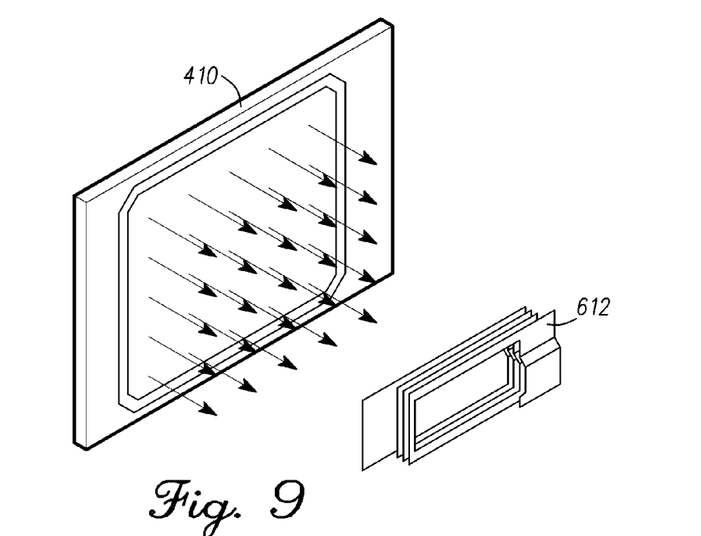
FIG. 9 shows orientation of a miniaturized antenna with respect to a magnetic field emitted from a reader.

FIG. 9 shows orientation of a miniaturized antenna with respect to a magnetic field emitted from a reader. Reader 410 emits electromagnetic energy at a particular frequency such as 13.56 MHz. As described above, the miniaturized antenna includes an inductive coil 612. The coil 612 is designed to couple as much magnetic field from reader 410 as possible.

The reader coil and the inductive coil 612 can be viewed as two coils in a transformer. The reader coil is fixed, and so coil 612 is designed as a secondary coil of the transformer coupling to the field from the reader coil (primary coil). Maximizing coupling area of the inductive coil 612 will increase the coupling between the reader coil and the antenna coil.

Figure 10:
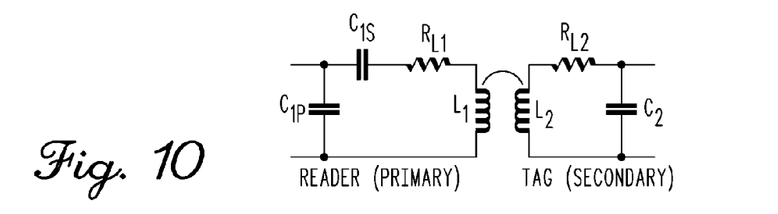
FIG. 10 shows transformer design.

FIG. 10 shows transformer design. The reader (primary coil of the transformer) is shown modeled with inductor L1, series resistance RL1, series capacitance C1S, and parallel capacitance C1P. The miniaturized antenna (secondary coil of the transformer) is shown modeled with inductor L2, series resistance RL2, and parallel capacitance C2.

Transformer coupling does not lend itself well to an exact design procedure because there are so many factors which influence the degree of coupling. The geometry of the coils, the spacing between them, the core materials used, and the shielding, all have a pronounced effect on the degree of coupling attained in any design. Decreasing the spacing between the primary and secondary coils increases the coupling. Increasing the permeability of the magnetic path increases the coupling. And shielding a transformer decreases its loaded Q and has the effect of increasing the coupling.

Figure 11:
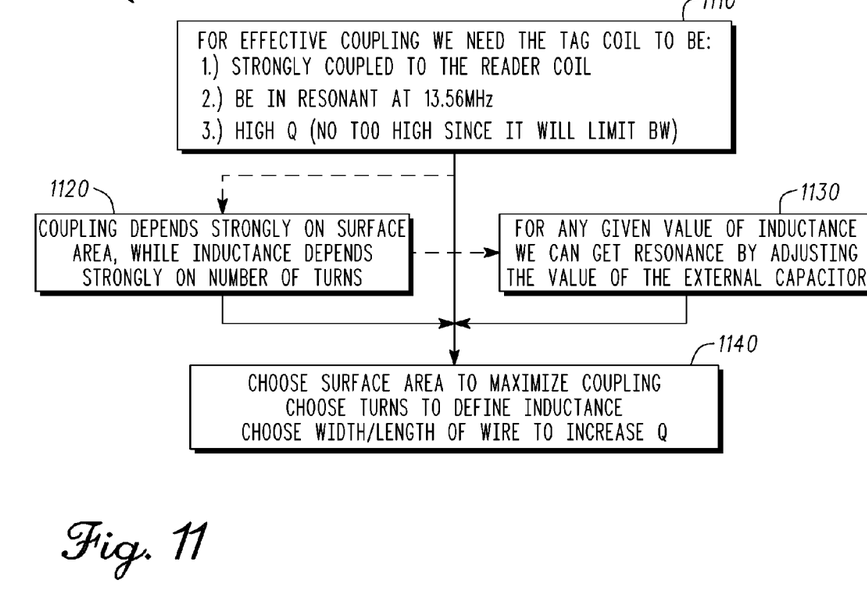
FIG. 11 shows a flowchart of methods in accordance with various embodiments of the present invention.

FIG. 11 shows a flowchart of methods in accordance with various embodiments of the present invention. Flowchart 1100 discusses factors to consider when designing a secondary transformer coil for use as a miniaturized antenna. At 110, it is recognized that for effective coupling, the secondary transformer coil should be strongly coupled to the reader coil, resonant at substantially 13.56 MHz, and have a high Q, but not too high since it will limit bandwidth (BW).

At 1120, it is recognized that coupling depends strongly on surface area, while inductance depends strongly on number of turns. At 1130, it is recognized that for any given value of inductance, resonance can be achieved by adjusting the value of an external capacitor.

At 1140, the surface area is chosen to maximize coupling, the number of turns in the coil is chosen to define the inductance, and width/length of wire is chosen to increase Q.

Figures 12, 13:
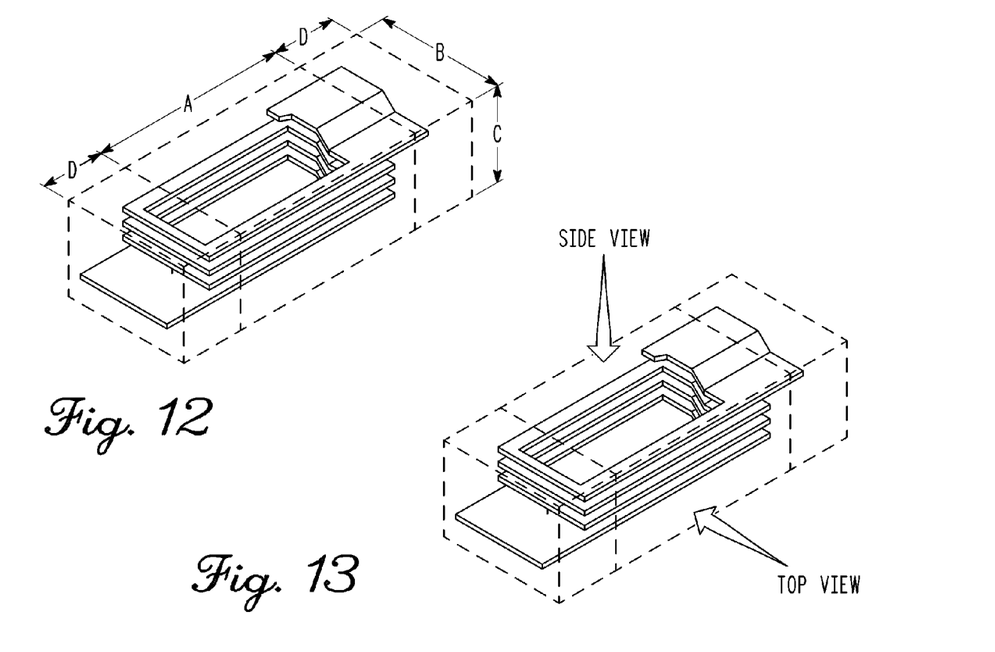
FIGS. 12-14 show miniaturized antennas.
Figure 14:
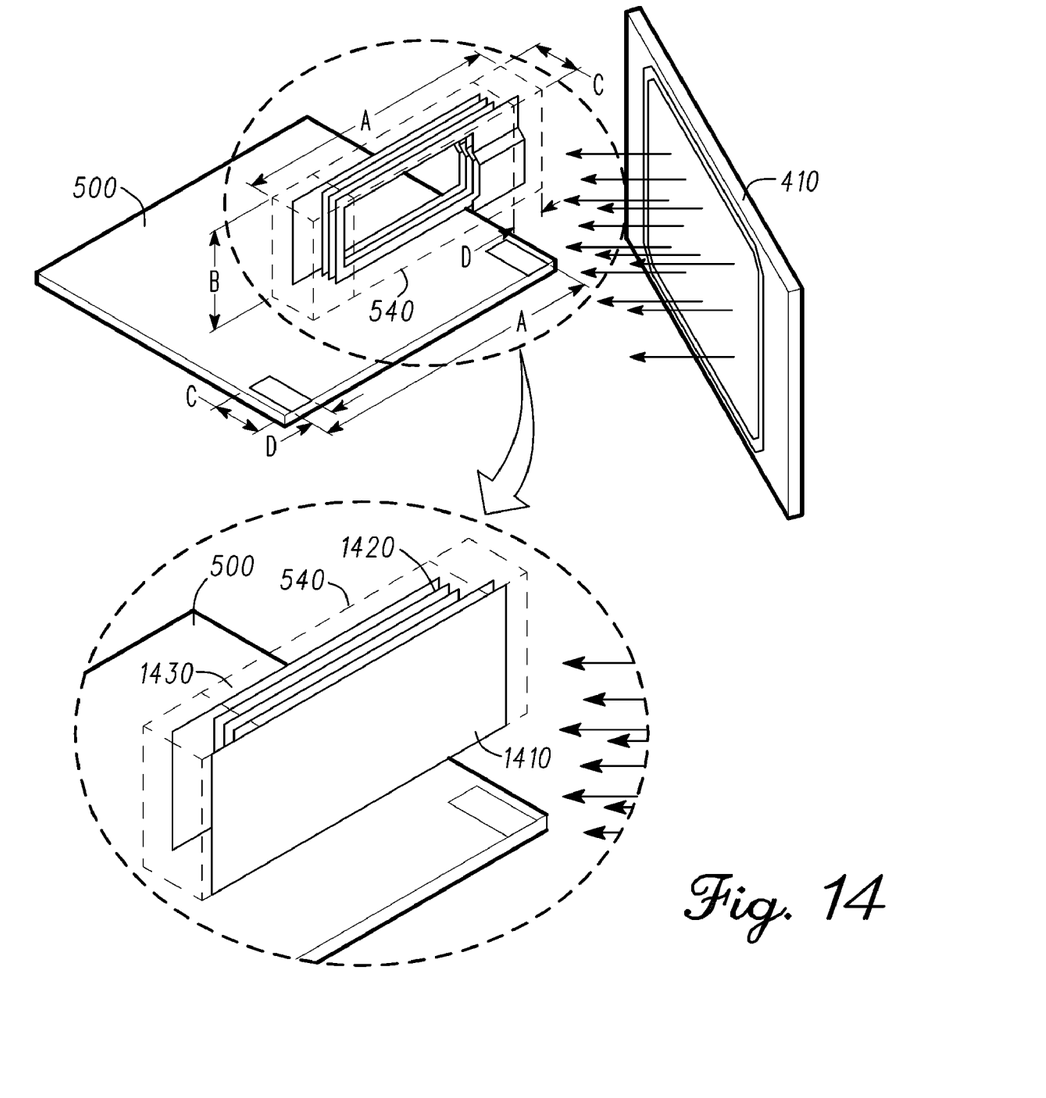

FIGS. 12-14 show miniaturized antennas. FIGS. 12 and 13 show an inductive element suitable for use as a miniaturized antenna at an outer edge of a memory card. The side view is the direction that is exposed to the magnetic field when in use. FIG. 12 defines "A" as the overall length, "B" as the overall height, and "C" as the overall depth. FIG. 12 also defines "D" as the length of the conductive end regions that couple the coil to the memory card. Example dimensions when used in an SD format are A=10.4 mm, B=0.7 mm, C=2 mm, and D=0.5 mm. These dimensions are provided as examples only, and the various embodiments of the invention are not so limited. For example, an inductive element for use in a micro-SD card will generally have smaller dimensions.

FIG. 14 shows the magnetic field entering the side view of the inductive element. FIG. 14 also defines the field coupling surface area 1410. When installed on a board, the field coupling surface area is substantially perpendicular to the board.

The mechanical structure of the antenna occupies the three dimensions of length A, height B, and depth C. The structure includes metal 1420 for forming the coil and a filling material 1430 to occupy the remaining volume. The filling material 1430 may be a composite of magnetic material or ceramic material. The metal winding for the 3D coil is made to occupy the perimeter tracing the length and height of the antenna to form its one turn. Additional turns are accomplished by repeating the perimeter tracing along the depth with ohmic connections between immediate turns to create a continuous rectangular coil like a rectangular spring.

The field coupling surface area 1410 is the surface area along the two dimensions that form the perimeter tracing. This area couples the field from an external source (such as reader 410) to the 3D antenna coil inducing voltage and current in the 3D antenna coil.

In some embodiments, antenna 540 is placed in the memory card 500 so that the length of the coil aligns with what will be the outer edge of the memory card when it is inserted into a host device. The inner edge of the memory card is where there will be the electrical connectors for the memory card bus to connect to the memory card slot.

In some embodiments, antenna 540 is oriented so that when the memory card is inserted in a host device the field coupling surface area 1410 is in parallel to the outer surface of the host device. This orientation will make the incident field from the external source predominately 90 degrees to the field coupling surface area. In combination with the placement this orientation will enable the field coupling surface area to be closest to the outer surface of the host, thereby maximizing the induced voltage and current in the 3D coil due to an external field source.

Figure 15A:
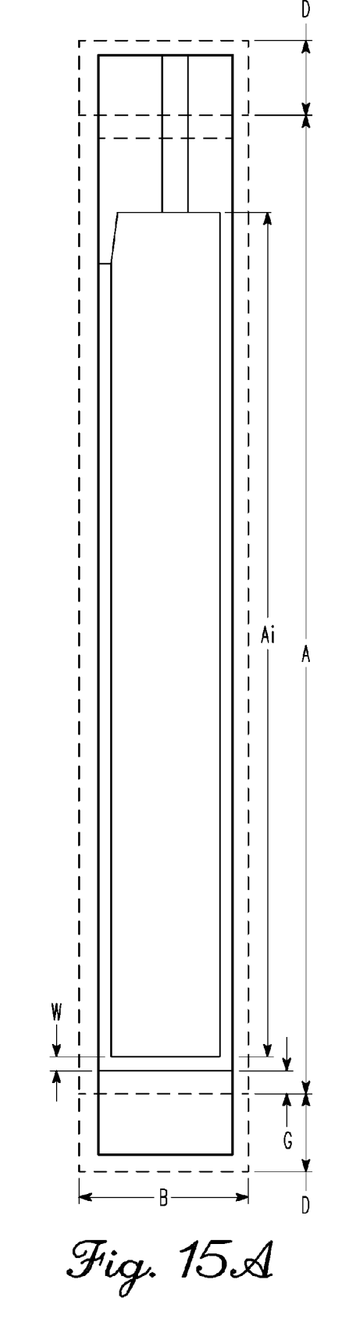
FIG. 15 shows dimensions of inductive coils.
Figure 15B:
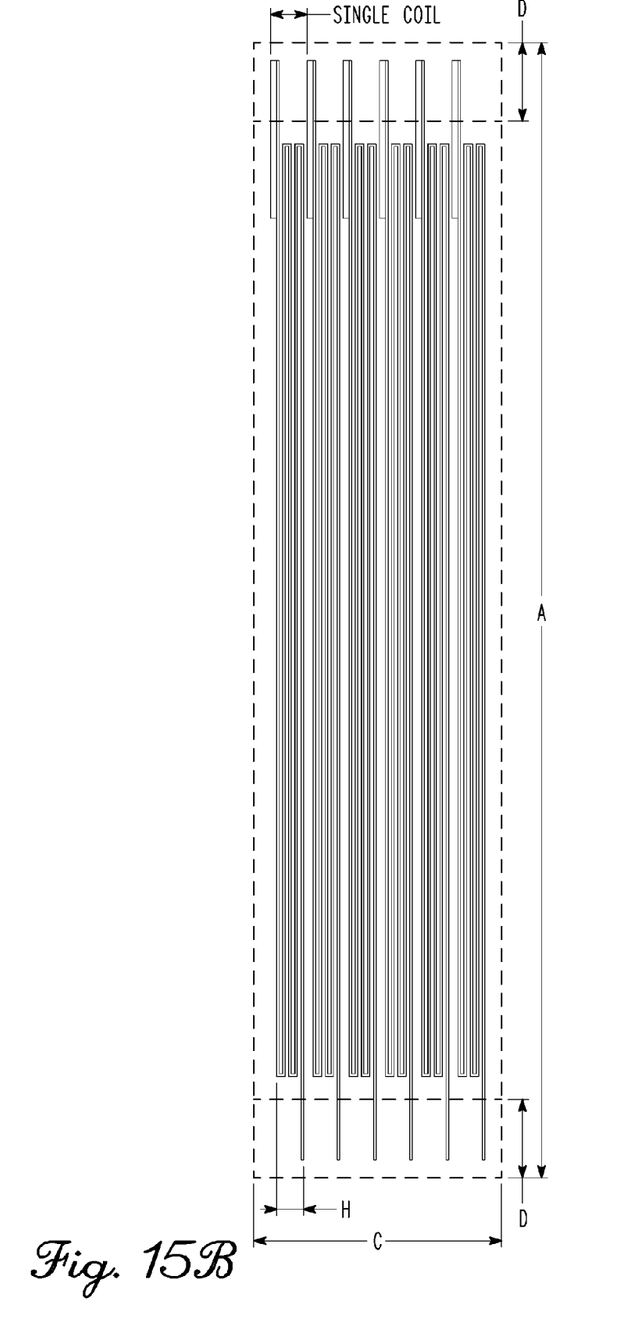

FIG. 15 shows dimensions of inductive coils. As shown in the top view a single antenna may include multiple coils in parallel. In the example of FIG. 15, M=6 coils are included with each coil having N=5.5 turns, although M and N may take on any value. The conductor length is given by $2(A_i+B_i+2w)(N-0.5)+A_i$, where $A_i$ and $B_i$ are the inner dimensions of the coil and w is the width of the conductor. As shown in the side view, the effective coupling surface area is increased when f and w are kept small to maximize $B_i$.

Figures 16, 17, 18:
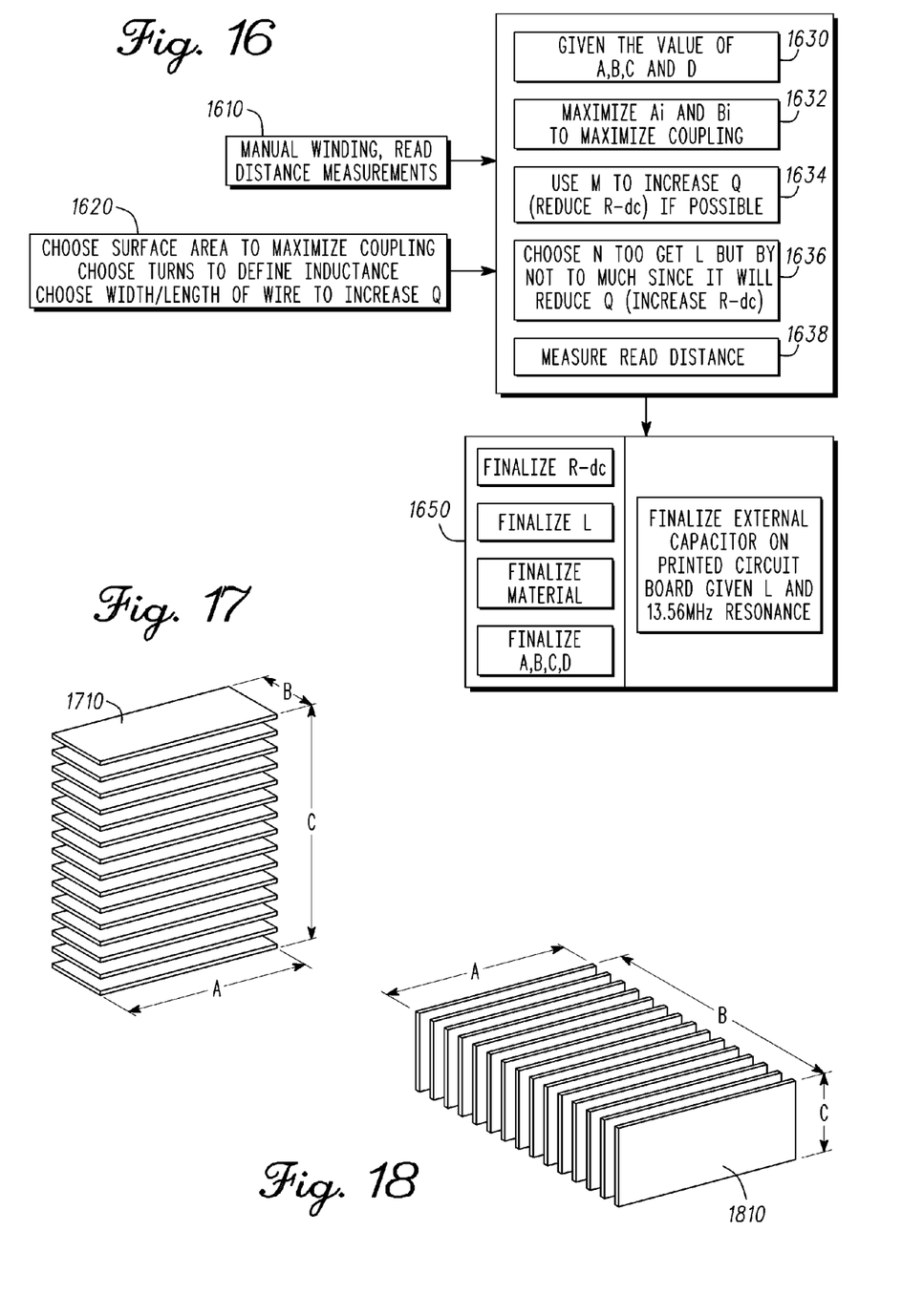
FIG. 16 shows a flowchart of methods in accordance with various embodiments of the present invention.
FIGS. 17 and 18 show inductive element layers in accordance with various embodiments of the present invention.

FIG. 16 shows a flowchart of design process methods in accordance with various embodiments of the present invention. At 1610, the manual winding and read distance measurements are provided. At 1620, the coupling surface area, the number of turns, and the width/length of wire are chosen. See FIG. 11.

At 1630, the dimensions A, B, C, and D are given. These values are constrained by the form factor of the memory card. At 1632, $A_i$ and $B_i$ are maximized to maximize coupling. Referring now back to FIG. 15, it is shown that the field coupling surface area is increased as $A_i$ and $B_i$ are increased.

At 1634, M is used to increase Q (decreasing the DC resistance) if possible. This corresponds to increasing the number M of parallel coils. See FIG. 15. At 1636, N is chosen to arrive at the desired inductance, taking into account increased number of turns N will increase DC resistance and lower Q.

At 1638, the read distance is measured. The various parameters can be modified and the read distance measured in an iterative process. At 1650, the various parameters are finalized to arrive at a final design. The DC resistance, the inductance, the material, and the dimensions A, B, C, and D can be finalized. The external capacitor (see C2, FIG. 10) on the printed circuit board can also be finalized given the inductance and the desired 13.56 MHz resonance.

FIGS. 17 and 18 show inductive element layers in accordance with various embodiments of the present invention. Layers include conductive materials and insulating materials. FIG. 17 shows a traditional method of forming a surface mount inductive element. Each layer includes a conductive loop, and the layers, when stacked, form multiple conductive loops. The minimum dimension w (FIG. 15) is limited by process requirements. The inductor is mounted on the board on its "side" to expose the field coupling surface area at the outer edge of the card. In these embodiments, the layers are perpendicular to the board. FIG. 18 shows an improved manufacturing method. Each layer forms only a portion of a conductive loop. For example, referring now to FIG. 19, the bottom layer 1970 include traces with trace ends. Intermediate layers 1920, 1930, 1940, 1950, and 1960 include through-traces at locations to electrically contact the trace ends on the lower layer, and upper layer 1910 has at least one conductive surface trace aligned to electrically contact the conductive through-traces to form a conductive coil having at least one turn. The traces on layers 1910 and 1970 can be on either side of the substrate.

Figure 19:
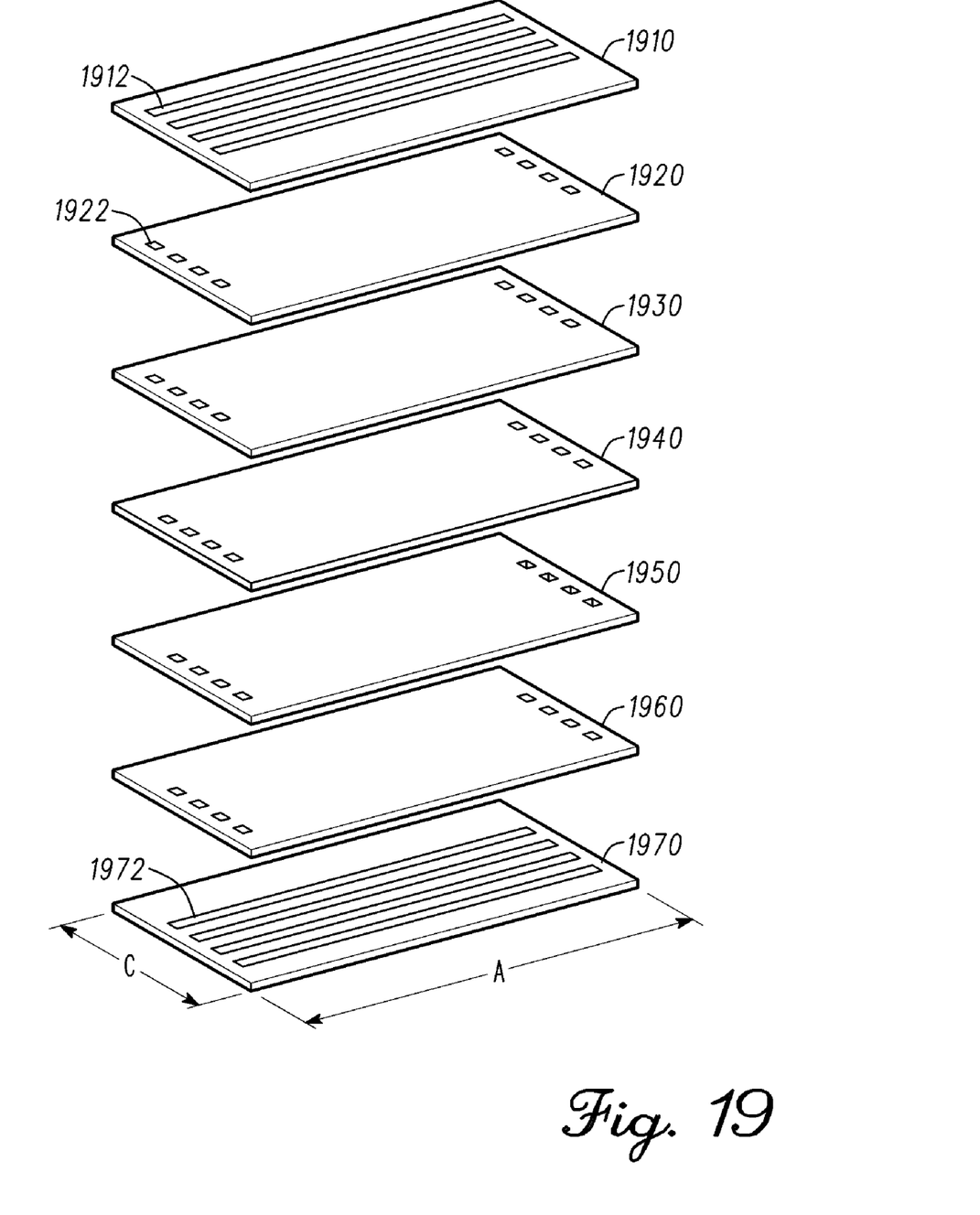
FIG. 19 shows layers in an inductive element.
Figure 20:
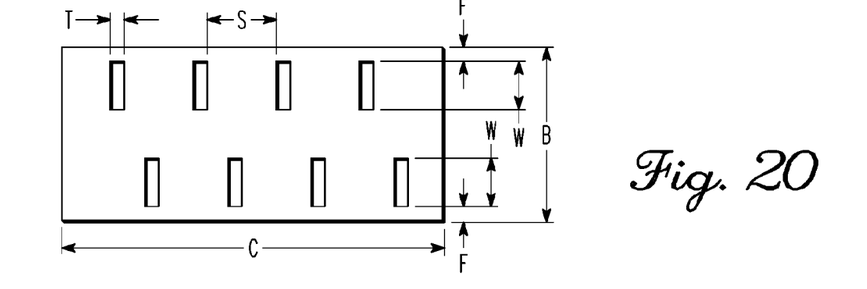
FIGS. 20-23 show cross sections of inductive elements in accordance with various embodiments of the present invention.

In some embodiments, the inductive elements include magnetic material such that a magnetic core is formed inside the conductive coil. Further, in some embodiments, the inductive elements include magnetic material outside the conductive coils.

Figure 21:
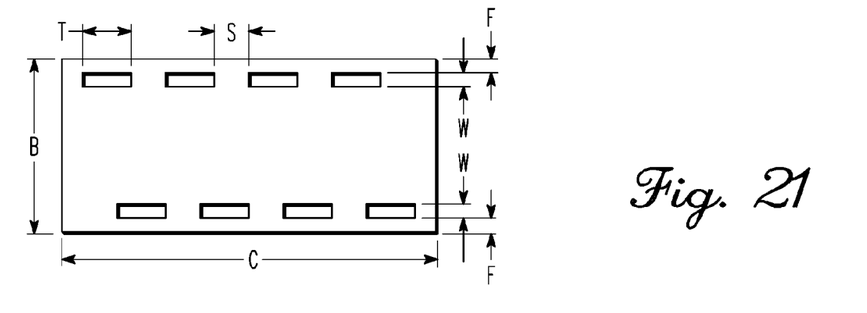
Figure 22:
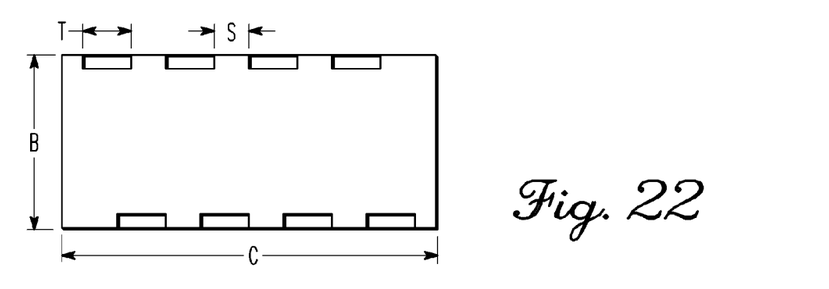
Figure 23:
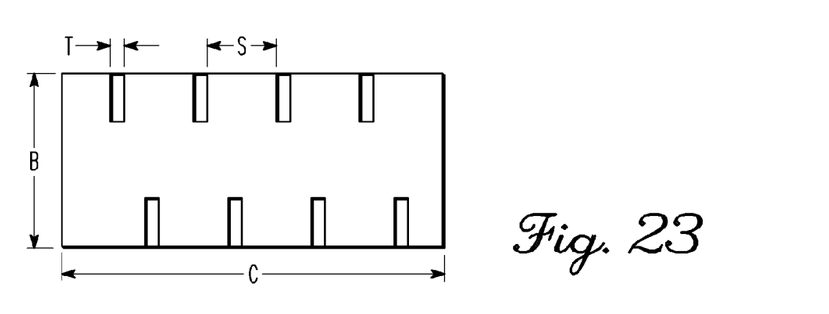

FIGS. 20-23 show cross sections of inductive elements in accordance with various embodiments of the present invention. FIGS. 21 and 23 show inductive elements that are made using layers in the same plane as the field coupling surface area. FIGS. 21 and 22 show inductive elements that are made using layers perpendicular to the field coupling surface area. Note that the width w of the traces is smaller in the FIGS. 21 and 22, thereby increasing the effective field coupling surface area. The effective field coupling surface area is further increased in FIGS. 22 and 23 by extending the conductive traces to the end of the device.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. An inductive element comprising:
a bottom surface; and
a plurality of layers substantially parallel to the bottom surface, the plurality of layers including a combination of electrically conductive material and electrically insulating material such that when bonded together the plurality of layers form at least one conductive coil having a field coupling surface area substantially perpendicular to the bottom surface.

2. The inductive element of claim 1 further comprising bonding areas on the bottom surface.

3. The inductive element of claim 1 wherein the plurality of layers include magnetic material forming a magnetic core within the at least one conductive coil.

4. An electronic device comprising:
a circuit board with a memory card slot interface;
a contactless communications device affixed to the circuit board, the contactless communications device having an antenna port; and
an inductive element affixed to the circuit board and electrically coupled to the antenna port, the inductive element having a conductive coil with a field coupling surface area substantially perpendicular to the circuit board.

5. The electronic device of claim 4 wherein the inductive element comprises a multilayer surface-mount inductor.

6. The electronic device of claim 5 wherein the multilayer surface-mount inductor is formed with layers substantially parallel to the circuit board.

7. The electronic device of claim 5 wherein the multilayer surface-mount inductor is formed with layers substantially perpendicular to the circuit board.

8. The electronic device of claim 4 wherein the memory card slot interface comprises a Secure Digital (SD) compatible interface.

9. The electronic device of claim 4 wherein the memory card slot interface comprises a micro Secure Digital (SD) compatible interface.

10. The electronic device of claim 4 wherein the memory card slot interface comprises a mini Secure Digital (SD) compatible interface.

11. An apparatus comprising:
a memory card compatible substrate having at least one surface, an inner edge, and an outer edge opposite the inner edge;
electrical contacts on the at least one surface and situated along the inner edge; and
a conductive coil situated along the outer edge, the conductive coil having a field coupling surface area substantially perpendicular to the at least one surface.

12. The apparatus of claim 11 wherein:
the at least one surface includes a top surface and a bottom surface substantially parallel to each other; and
the electrical contacts are on the top surface, and the conductive coil is on the top surface.

13. The apparatus of claim 11 wherein:
the at least one surface includes a top surface and a bottom surface substantially parallel to each other; and
the electrical contacts are on the top surface, and the conductive coil is on the bottom surface.

14. The apparatus of claim 11 wherein the conductive coil comprises a multilayer surface-mount inductor.

15. The apparatus of claim 14 wherein the multilayer surface-mount inductor is formed with layers substantially parallel to the at least one surface.

16. The apparatus of claim 14 wherein the multilayer surface-mount inductor is formed with layers substantially perpendicular to the at least one surface.

17. An apparatus comprising:
a memory card compatible substrate having at least one surface, an inner edge, and an outer edge opposite the inner edge;
electrical contacts on the at least one surface and situated along the inner edge; and
a three dimensional conductive coil situated along the outer edge;
wherein the apparatus has a micro secure digital (microSD) form factor, and wherein the three dimensional conductive coil has a field coupling surface area substantially perpendicular to the at least one surface of the memory card.

* * * * *